Aug. 14, 1956     D. H. NUNN ET AL     2,758,769
SAFETY BELT OR HARNESS FOR CHILDREN
Filed June 15, 1953
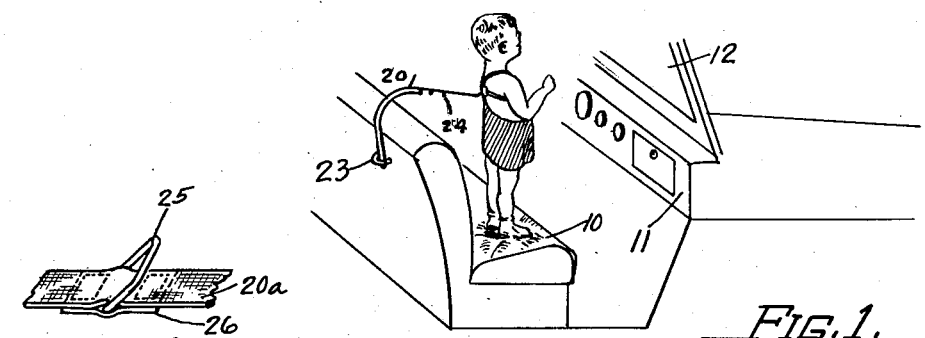
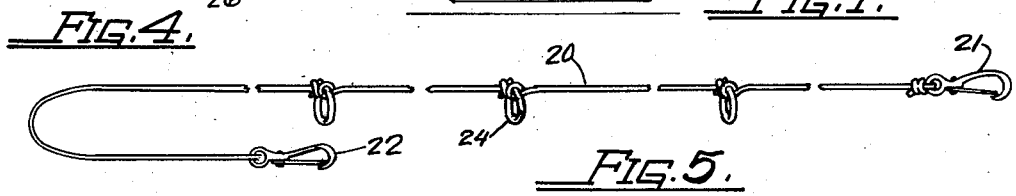
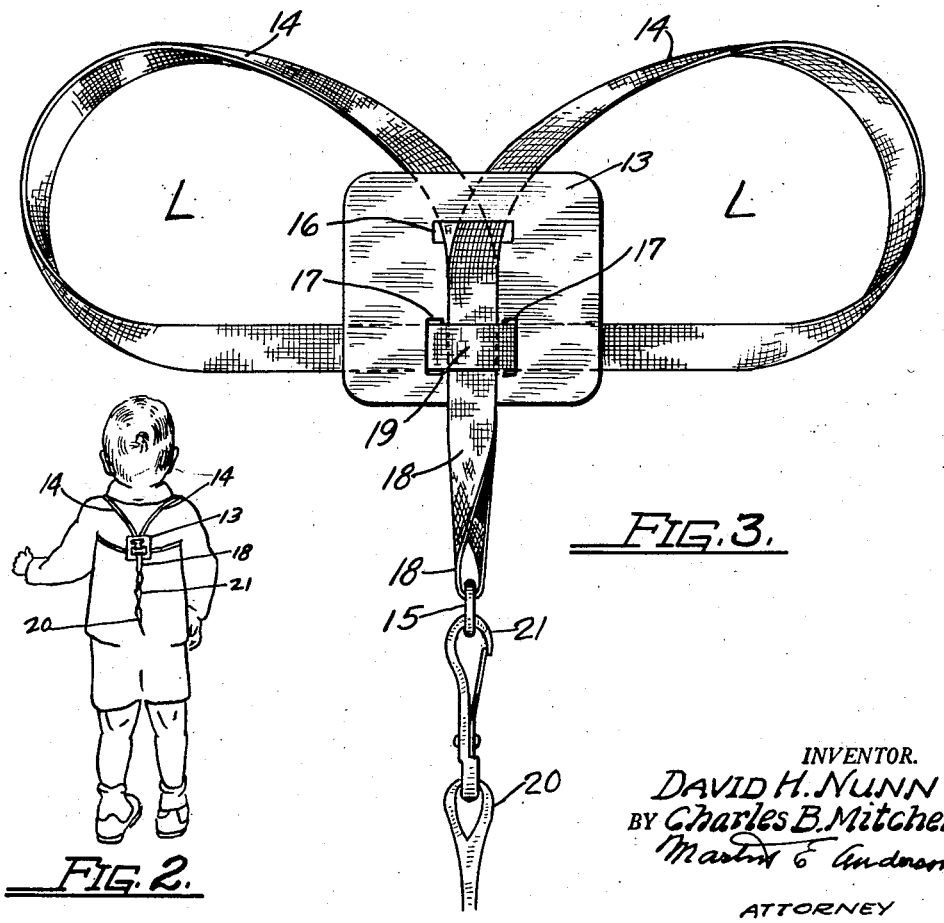
INVENTOR.
DAVID H. NUNN &
BY Charles B. Mitchell
ATTORNEY the # United States Patent Office 2,758,769
Patented Aug. 14, 1956

2,758,769

SAFETY BELT OR HARNESS FOR CHILDREN

David H. Nunn, Grand Junction, and Charles B. Mitchell, Denver, Colo.

Application June 15, 1953, Serial No. 361,578

3 Claims. (Cl. 227—49)

This invention relates to safety belts or harnesses and has reference more particularly to an improvement in automobile safety harnesses for children.

In the present automobile and airship age children of all ages are transported in the family automobile, and on longer trips accompany their parents in airships.

When traveling in automobiles children like to move around and often stand on the seat cushions and since an automobile must change its speed frequently, they sometimes fall and are seriously injured. Many inventors have recognized this difficulty or danger and several patents have been issued for safety harnesses or belts for the purpose indicated.

It is the object of this invention to produce a device of the class mentioned which shall be of simple but substantial construction, which can be manufactured and sold at a moderate price; can be quickly applied and removed from the child, and which will not slide or fall from the child.

The above and other objects that may appear as this description proceeds are attained by means of a combination and arrangement of parts that will now be described in detail for which purpose reference will be had to the accompanying drawing in which the invention has been illustrated and in which Figure 1 is a view showing the device in actual use and shows how the child is protected while standing on an automobile seat;

Figure 2 is a rear view of a child showing the device as it appears from the back and Figure 3 is an enlarged view showing the device removed from the child and shows the manner in which the several parts are assembled and arranged.

Figure 4 is a fragmentary detail showing a portion of a leash of nylon tape provided with spaced D-rings.

Figure 5 shows one form of leash.

Referring now to the drawing reference numeral 10 designates the front seat cushion of an automobile; 11 the instrument board and 12 the windshield. The child is shown as standing near the front of the seat and is held from falling forwardly by the belt or harness by which he is attached to the seat.

The belt or harness to which this application relates is most clearly shown in Figure 3 to which reference will now be had. The device comprises three elements, a plate 13, a tape or cord 14, and a ring 15. The plate has an elongated opening 16 and spaced therefrom are two openings 17 spaced a short distance from it. The cord or tape in the completed article is preferably endless and has a bight 12 that passes through opening 16. The cord is formed into two loops L as shown, and is formed into a short bight 19 that extends through openings 17 a sufficient distance to permit bight 18 to pass through it as shown in Figure 3.

The harness is applied to the child by passing its arms through the loops with plate 13 at its back, as shown in Figure 2. Bight 18 is pulled through bight 19; tightening the harness sufficiently to assure that it will not fall off. A leash 20 has one end provided with a snap 21 with which it is attached to ring 15, and the other end is provided with a snap 22 that after it is passed through an eyelet 23 fastened to the back of the front seat or to any other suitable part of the automobile is snapped into one of the several rings 24 that are knotted to the leash as shown in Figure 5.

The harness and leash can be used for leading the child on a crowded sidewalk or other place.

The length of the leash is such that the child can sit on the cushion when it desires and such that it can stand up as shown in Figure 1.

When used as a safety device during an automobile ride the child has perfect freedom to sit, lie down or stand and cannot be catapulted from the seat if the car stops suddenly or decelerates fast. If the child falls from a standing position it falls onto the soft upholstery and won't be injured.

The harness is easily applied and removed and the plate and the cord or tape can be made of material that will give it an ornamental appearance. The friction between bights 18 and 19 is sufficient to retain the parts in adjusted position and still permit the parts to be easily adjusted for removal or to assure the child's comfort.

The harness is usually applied in such a way that the side of plate 13 that is shown in Figure 3 will face outwardly. It may sometimes be desirable to apply the harness in such a way that the side shown on the outside in Figure 3 faces the child's body in which position there will be a greater amount of friction to accidental sliding of the elongated bight portion. The friction at the point of crossing of 18 and 19 is representative of friction means and can be increased by suitable modifications.

In Figure 4 a detail is shown comprising a section of flat nylon tape leash 20a provided with a plurality of spaced D-rings 25 held in place by short tape section 26.

Member 14 is referred to indiscriminately as a cord or tape, either of which may be used.

What is claimed as new is:

1. A safety harness for children, comprising in combination, an endless cord loop, a plate having at least two laterally spaced openings, the loop having a portion thereof folded into an elongated bight which extends through one opening only, another portion of the loop being formed into a short bight that projects through the other opening in the plate to the side on which the first bight is positioned, said first bight passing through the second bight between the cord and the plate, the endless cord being formed into two loops whose size can be varied by sliding the first bight through the second, said second bight forming a friction means tending to retain the parts in adjusted position.

2. A safety harness for children comprising, in combination, a plate having three spaced openings positioned one at each vertex of an isosceles triangle, an endless cord loop having a portion folded to form an elongated bight which passes through the opening at the vertex and extends over the plate between the other two openings, a portion of the cord extending through the openings at the ends of the triangle base, that portion between the last mentioned openings passing over the elongated bight, whereby two loops adapted to receive and encircle a child's shoulder are formed.

3. A safety harness for children, comprising in combination, a plate having one elongated opening near one edge thereof and parallel with the edge, and a pair of spaced elongated openings adjacent the other edge, said openings being perpendicular to the first opening, and a tape or the like, threaded through the pair of openings leaving a bight on one side, the tape having a portion thereof doubled and passed through the one opening and along the side of the plate between it and the bight, the portions of the tape between the openings forming loops for the reception of a child's arms and shoulders.

References Cited in the file of this patent

UNITED STATES PATENTS

| | | |
|---|---|---|
| 921,812 | Dorf | May 18, 1909 |
| 1,711,864 | Whidden | May 7, 1929 |
| 1,991,633 | Serpico | Feb. 19, 1935 |